(12) United States Patent
Krolak et al.

(10) Patent No.: US 10,001,401 B2
(45) Date of Patent: Jun. 19, 2018

(54) CONFIGURING AN ELECTRONIC LEVEL GAUGE INCLUDING POSITION FOR AN APPLICATION

(71) Applicant: HONEYWELL INTERNATIONAL INC., Morristown, NJ (US)

(72) Inventors: Adam Krolak, North Vancouver (CA); Stuart James Heath, Surrey (CA)

(73) Assignee: Honeywell International Inc., Morristown, NJ (US)

( * ) Notice: Subject to any disclaimer, the term of this patent is extended or adjusted under 35 U.S.C. 154(b) by 718 days.

(21) Appl. No.: 14/321,150

(22) Filed: Jul. 1, 2014

(65) Prior Publication Data

US 2015/0204712 A1    Jul. 23, 2015

Related U.S. Application Data

(60) Provisional application No. 61/930,695, filed on Jan. 23, 2014.

(51) Int. Cl.
| | |
|---|---|
| *G01F 25/00* | (2006.01) |
| *G01F 23/284* | (2006.01) |
| *G01F 23/296* | (2006.01) |
| *G01S 13/08* | (2006.01) |
| *G01S 15/08* | (2006.01) |

(Continued)

(52) U.S. Cl.
CPC ........ *G01F 25/0061* (2013.01); *G01F 23/284* (2013.01); *G01F 23/296* (2013.01); *G01S 7/40* (2013.01); *G01S 7/52004* (2013.01); *G01S 13/08* (2013.01); *G01S 13/88* (2013.01); *G01S 15/08* (2013.01); *G01S 15/88* (2013.01)

(58) Field of Classification Search
CPC .. G01F 25/0061; G01F 23/284; G01F 23/296; G01S 13/08; G01S 15/88; G01S 7/40; G01S 7/52004; G01S 13/88; G01S 15/08
USPC .......................................................... 702/94
See application file for complete search history.

(56) References Cited

U.S. PATENT DOCUMENTS

| | | | |
|---|---|---|---|
| 8,842,874 B1 * | 9/2014 | Alphenaar | G06T 7/62 382/100 |
| 2004/0066324 A1 | 4/2004 | Haynes | |

(Continued)

FOREIGN PATENT DOCUMENTS

WO    2007097688    8/2007

*Primary Examiner* — Yoshihisa Ishizuka
(74) *Attorney, Agent, or Firm* — Jetter & Associates, P.A.

(57) ABSTRACT

A method of configuring an electronic level gauge (ELG) includes with an ELG configuration tool including a GUI having a user interface. A processor implements an enhancement algorithm and a simulator. A tank library includes a plurality of tank shapes. The user interface receives application configuration information including a selection of a tank shape, a mounting location for positioning the ELG, and at least one process detail. The simulator generates a calculated strength of a measurement signal reflected from a surface of material in the tank for at least one level. If the calculated strength is ≥ a predetermined strength, proper performance of the ELG is indicated, and if the calculated strength < the predetermined strength, the ELG configuration tool prompts a change in at least one application of the configuration information to be entered on the user interface, and the simulator then recalculates the calculated strength.

15 Claims, 4 Drawing Sheets

(51) Int. Cl.
*G01S 7/40* (2006.01)
*G01S 7/52* (2006.01)
*G01S 13/88* (2006.01)
*G01S 15/88* (2006.01)

(56) References Cited

U.S. PATENT DOCUMENTS

| | | |
|---|---|---|
| 2009/0282892 A1 | 11/2009 | Sai |
| 2010/0299105 A1 | 11/2010 | Vass et al. |
| 2012/0084025 A1 | 4/2012 | van Schie |
| 2014/0083183 A1 | 3/2014 | Edvardsson |

* cited by examiner

CONFIGURING AN ELECTRONIC LEVEL GAUGE INCLUDING POSITION FOR AN APPLICATION

CROSS REFERENCE TO RELATED APPLICATIONS

This application claims the benefit of Provisional Application Ser. No. 61/930,695 entitled "CONFIGURING AN ELECTRONIC LEVEL GAUGE INCLUDING GAUGE POSITION FOR AN APPLICATION", filed Jan. 23, 2014, which is herein incorporated by reference in its entirety.

FIELD

Disclosed embodiments relate to methods and tools that provide electronic level gauge (e.g., guided radar, free-space radar, ultrasonic level) configuration including positioning of the electronic level gauge based on application parameters.

BACKGROUND

A radar level gauge is commonly used in industry as part of a-guided wave radar (GWR) system to measure the amount (e.g., level) of material (liquid or bulk solid (e.g., powder)) in a tank or a storage tank. A radar gauge provides continuous level (volume) measurement of high reliability at a generally reasonable price. The reliability is obtained due to lack of moving parts and insensitivity of the measurements to changes in process pressure, temperature, and density of measured material. The same applies to an ultrasonic level gauge, but the ultrasonic level gauge generally has a smaller allowable range of pressure and temperature.

The radar gauge for guided or free-space radar is mounted on top of the tank and measures the distance from a reference point, usually a mounting flange at the top of the antenna to the surface of the product material in the tank using reflection of the measuring signal from the surface of the product material. The product level value is obtained by subtracting the measured distance from a total height of the tank. Similarly, the ultrasonic gauge is mounted on top of the tank.

A guided radar gauge, free-space radar gauge or ultrasonic level gauge generally needs to be custom ordered (configured) based specific conditions for a given application, such as application specific maximum temperature, maximum pressure, type of medium, process connection, and tank shape. In the case of a GWR gauge this customization allows for an appropriate choice of sealing, process connection mount, antenna material, and antenna length. Incorrect customization (configuration) at the point of purchase can lead to improper function of the GWR gauge and thus improper function of the measuring system.

Another configuration item is the position the electronic level gauge (ELG) mounted on top of the tank. If there are obstacles in the path of the radar or the ultrasonic signal (measurement signal) between the antenna of the gauge and the surface of the measured material in the tank, measurement may be difficult or impossible. An obstacle is any internal non-product item in the tank or other object in the path of the measurement signal or close to the signal path of the measurement signal. The mounting location should provide an essentially unobstructed path between the antenna of the ELG and the surface of the measured material at each filling level. Particularly in the case of a GWR, there needs to be an unobstructed area around and along the waveguide.

The closest allowable distance between the path of the measurement signal and obstacles in the tank generally depends on the shape of the tank, measured material (i.e., its dielectric constant), maximum material level, and customization of the ELG. Taking into account all of these variables, correct customization, and positioning of the ELG in the tank is generally a challenging task. Moreover, if an already installed ELG needs to be modified or moved to another position on the tank due to unsatisfactory performance, this can lead to significant costs and possible customer' dissatisfaction.

SUMMARY

This Summary briefly indicates the nature and substance of this Disclosure. It is submitted with the understanding that it will not be used to interpret or limit the scope or meaning of the claims.

Disclosed embodiments recognize there are online tools that provide radar gauge configuration for a guided wave radar (GWR) gauge based on application specific parameters, such as process pressure and temperature. Known online configuration tools allow choosing the radar gauge configuration based on pressure and temperature, but do not provide visualization of the tank and do not allow positioning of the gauge on the tank. In addition, such tools do not model or verify the performance of the proposed solution. Moreover, there are no known radar gauge configuration tools or methods that take into account the particular shape of the tank, type of radar process mount (nozzle, flange), and physical position of obstacles in the tank to customize, or model to verify the performance of the radar gauge.

Disclosed embodiments provide an electronic level gauge (ELG) configuration and simulation tool (ELG configuration tool) and method which assists individuals (e.g., users or customers) with customization and performance verification for a planned mounting position for an ELG, such as before purchase of the ELG. A disclosed graphical user interface (GUI) (see FIG. 2A and FIG. 2B described below) that interfaces with embedded algorithms in its ELG configuration and simulation tool allows a user having a user interface to enter application information for a planned product material level measurement. Application information includes process variables such as process pressure, temperature, as well as the type of measured material (e.g., its dielectric constant), turbulence of surface for liquid material, and other parameters (e.g., vapor pressure), and a required measurement range. Additionally, as noted above, disclosed GUIs allow users to enter application configuration information including the shape of the tank, material of the tank walls, positions, size, material of obstacles, and other information.

An algorithm of the ELG configuration tool uses the above data plus internally determined variables such as viscosity and the dielectric constant of the medium in the tank (e.g., based on stored internal lookup tables) to verify the choice of the customization and mounting location for the ELG. The verification is based on internal modeling (simulation) of the path of the measurement signal between the antenna/probe and surface of the measured material in the tank.

The modeling (simulation) performed can be based on known mathematical formulas for measurement signal propagation and practical measurement and parameterization of the various types of offered level measurement gauges, such as based on COMSOL Multiphysics (COMSOL) simulation software. The strength (power) of signal reflection from the surface of measured material can be automatically calculated for a plurality of material levels and compared with the strength of signal reflections from obstacles in the tank. Based on the comparison of the calculated signal levels, ELG customization and the mounting position can be verified and enhanced if determined to be needed. The use of disclosed tools and methods can avoid costly mistakes, since the performance of the ELG for a given application can be verified and optionally tuned for improving ELG performance before its purchase.

Additionally, disclosed ELG configuration tools allow exporting configuration and setup data entered during the verification process and uploading the data during production of the customized ELG. This saves time during installation of the ELG, because the data is entered only once, typically only during the first stage of the ELG ordering process.

DETAILED DESCRIPTION

Disclosed embodiments are described with reference to the attached figures, wherein like reference numerals, are used throughout the figures to designate similar or equivalent elements. The figures are not drawn to scale and they are provided merely to illustrate aspects disclosed herein. Several disclosed aspects are described below with reference to example applications for illustration. It should be understood that numerous specific details, relationships, and methods are set forth to provide a full understanding of the embodiments disclosed herein.

One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. Disclosed embodiments are not limited by the illustrated ordering of acts or events, as some acts may occur in different orders and/or concurrently with other acts or events. Furthermore, not all illustrated acts or events are required to implement a methodology in accordance with this Disclosure.

Disclosed ELG configuration tools allow a user to "build" an application in the graphical interface of the software tool, and to simulate how the built application works to verify proper operation (e.g., the reflected signal is strong enough) before purchase. The user can build a working application with any obstacles in the tank, to see if the reflection from the product in the tank is strong enough, taking into account the shape of the tank and the position of the ELG. However, as described below, a more comprehensive application includes one or more obstacles which may be present in a particular application that disclosed simulation and verification support to provide more value to the user.

The minimum that the user generally needs to provide to simulate a particular the application is the tank shape (with tank dimensions), position of the ELG on the tank and process details (e.g., product in the tank, temperature, pressure, maximum and minimum product level in the tank to be measured), and ELG details (type of process connection, type and length of antenna). Disclosed software can propose a type and length of the antenna and the user can accept it or have an opportunity to choose another option. Optional elements that a user can add can include obstacles (with dimensions and position in the tank), and additional process details (foam on the surface of the product, turbulence, presence of condensation).

Figure 1:
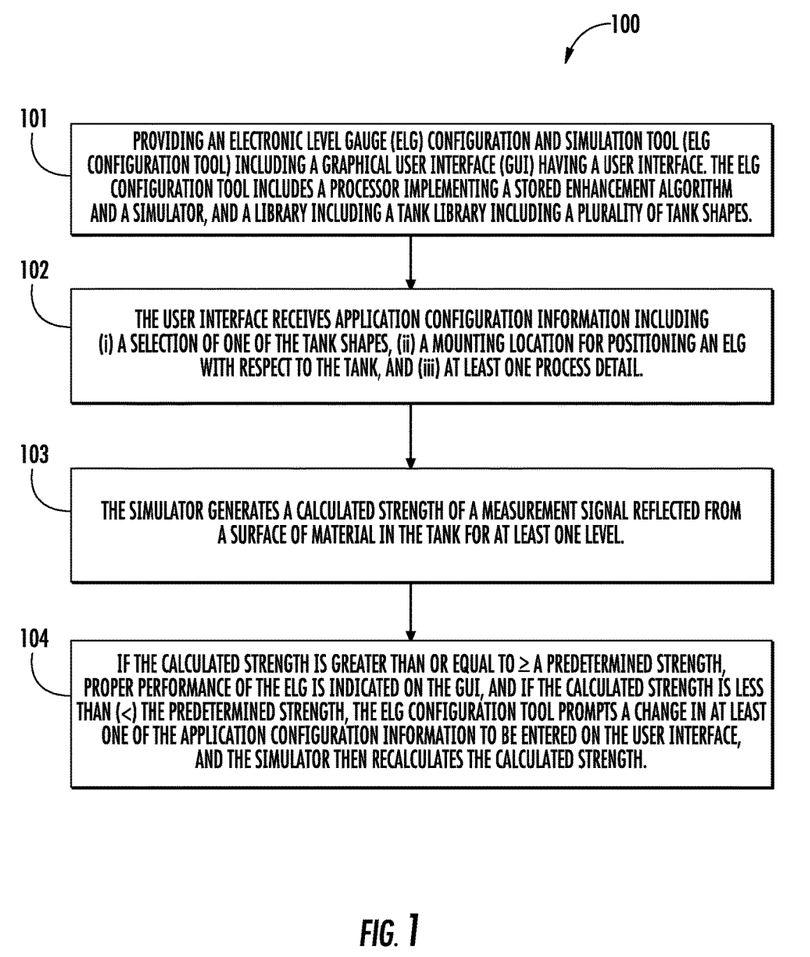
FIG. 1 is a flow chart for an example method of configuring an ELG, according to an example embodiment.

FIG. 1 is a flow chart for an example method 100 of configuring an ELG, according to an example embodiment. Step 101 comprises providing an ELG configuration tool including a GUI having a user interface. The ELG configuration tool includes a processor implementing a stored enhancement algorithm and a simulator, and a library including a tank library including a plurality of different tank shapes, and generally also an obstacle library including a plurality of tank obstacles.

Step 102 comprises the user interface receiving application configuration information from a user including (i) selection of one of the tank shapes (ii) an identification of a mounting location for positioning the ELG (i.e., typically on a top of the tank or on a nozzle on the top of the tank), and (iii) at least one process detail. As noted above, the process detail can be selected from process pressure, temperature, and type of material in the tank. The application configuration information can also include (iv) a selection of at least a first obstacle from the plurality of tank obstacles, and (v) a position for the first obstacle in a tank (first obstacle position).

Step 103 comprises the simulator generating a calculated strength (e.g., power) of a measurement signal reflected from a surface of material in the tank for at least one level. The strength for one material level can be simulated (e.g., a critical level) or various material levels can be simulated.

In step 104, if the calculated strength is greater than or equal to ≥ a predetermined strength, proper performance of the ELG is indicated on the GUI, and if the calculated strength is less than (<) the predetermined strength, the ELG configuration tool prompts a change in application configuration information including the mounting location, and generally also the first obstacle, and the first obstacle position, to be entered on the user interface, and the simulator then recalculates the calculated strength. The predetermined strength can be the measurement signal reflected from the first obstacle plus a predetermined amount, or a minimum signal strength deemed to be required by a manufacturer for a given radar gauge in their particular application.

Upon the user initiating the enhancement algorithm, the ELG configuration tool can automatically propose a change to customization of a configuration aspect of the ELG or a new different location. The configuration aspect can be selected from the type of probe (or antenna), the probe length, the probe material, and the connection type (e.g., threaded or nozzle connection).

The ELG can comprises a GWR gauge or a free-space radar gauge. The ELG can also comprise an ultrasonic level measurement gauge. The method can include transferring application data for a target application from the ELG configuration tool to both a manufacturing facility for the ELG configuration tool and to a memory of the ELG.

GWR gauges, free-space radar gauges, and ultrasonic level measurement gauges each work in essentially the same manner. These gauges including a transmitter and an adapter installed on top of the tank or on a nozzle, with the antenna facing down. The measurement signal is sent towards the measured medium, reflects, and returns to the gauge to be evaluated by its associated signal processing electronics.

There are some differences in the design of the antenna for the respective gauges. In the case of free-space radar and ultrasonic transmitters, the antenna extends into the tank by only a relatively short distance. The measuring signal is propagated from the antenna towards the measured material through free-space (air or other gas in the tank). In the case of GWR, the antenna (waveguide) extends all the way to the bottom of the tank, or a portion of the tank (if only a portion of the tank needs to be measured). The measurement signal propagates along the antenna (waveguide) to the product and then back to the gauge.

There is also a difference in the measurement signal. In case of free-space radar and GWR, the measurement signal is an electromagnetic wave. In case of an ultrasonic transmitter, the measurement signal is a mechanical wave (ultrasound). Accordingly, as used herein, these various gauges and related methods are generally each referred to herein as being an ELG having an antenna that operates using a "measurement signal" that is a return signal.

Figure 2A:
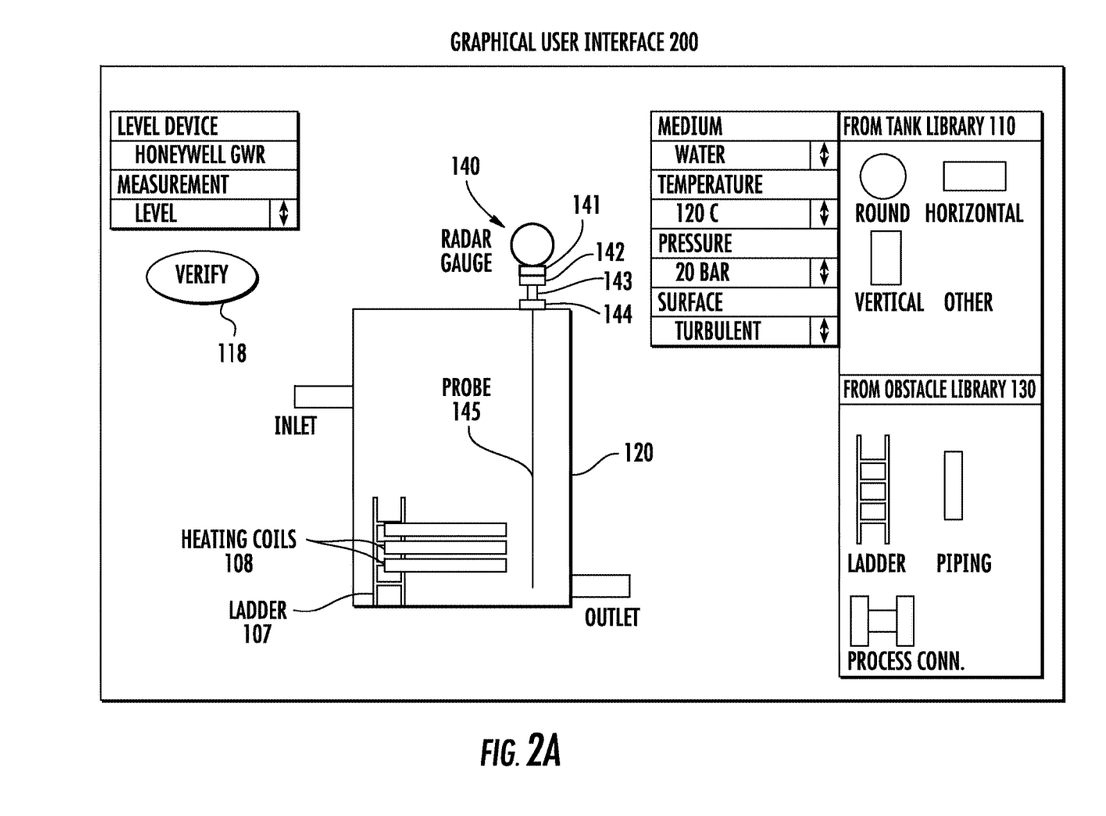
FIG. 2A is a depiction of an example GUI that obtains information from the computing portion of its ELG configuration and simulation tool described for configuring a GWR gauge, according to an example embodiment.

FIG. 2A is depiction of an example graphical user interface (GUI) 200 of a disclosed ELG configuration and simulation tool (see the example ELG configuration and simulation tool in FIG. 3 described below), where the GUI 200 obtains information from the ELG configuration tool, described with regard to configuring a radar gauge (or transmitter) 140 for a GWR system, according to an example embodiment. The GUI 200 shown includes contents obtained from a tank library 110 (see tank library 110 in ELG configuration and simulation tool 300 in FIG. 3) including a variety of tank shapes that can be used to describe the shape of the tank 120 and where the radar gauge 140 will be mounted as shown in FIG. 1. Additionally, an upload of engineering drawings in a standard format to a memory of the configuration and simulation tool is also provided in another embodiment (See memory 345 of ELG configuration tool 300 in FIG. 3). Moreover, the ELG configuration tool allows customization of obstacles in the tank 120 from an obstacle library 130 (See obstacle library 130 in the ELG configuration tool 300 shown in FIG. 3).

Disclosed GUIs such as GUI 200 shown in FIG. 2A have a user interface such a mouse (see mouse 340 in FIG. 3) or a touch sensitive screen provided for editing and navigation to allow user' selection from options provided by the embedded software in the various categories included. Software is also generally provided so that each obstacle from the obstacle library 130 can be edited (e.g., using a mouse) by the user to select a particular size, shape and material for the obstacle. Finally, obstacles and construction elements can be easily placed into a drawing/depiction of the tank 120, such as with the ladder 107 and heating coils 108 shown in the tank 120 in the GUI 200 shown in FIG. 2A. The radar gauge 140 (including a transceiver, not shown) is shown including connectors to the tank nozzle (e.g., coaxial connectors) 141, 142, 143 and 144, which couple to a single conductor probe 145 that extends well into the product material (not shown) in the tank 120.

To speed up the process of configuring and positioning the ELG such as radar gauge 140, some default tank configurations are provided. A drawing of radar gauge 140 can be positioned in a proposed mounting location on the top surface or nozzle of the tank 120.

Elements 142, 143, 144 shown in FIG. 2A represent a nozzle. Element 142 is an upper flange of the nozzle. Element 143 is the middle part of the nozzle, a pipe. Element 144 is a connection between the nozzle and the top of the tank 120. The radar gauge 140 is connected to the upper flange 142 of the nozzle by a flange 141 that matches the upper flange of the nozzle.

Disclosed embodiments also apply to nozzle-less embodiments. If a nozzle is not used, the radar gauge 140 can be connected to the tank by a threaded connection. In this arrangement, the top surface of the tank is drilled and tapped. The radar gauge 140 would have a threaded connection that is mounted in the threaded hole in the tank. Other connection types or mounting above an open tank are also possible.

Additional process details can be entered by the user via a user interface, for example, process pressure, temperature, and type of measured material (e.g., its dielectric constant).

The "verify" button 118 shown in FIG. 2A when initiated by a user begins executing an internal simulation (see simulator 125 in configuration tool 300 in FIG. 3) to calculate the strength (power) of the measurement signal (here a radar signal) reflected from the surface of measured material in the tank 120 at various levels and from obstacles in the tank 120. One constraint that is generally used is that the strength (power) of signal reflected from the surface of measured (product) material in the tank 120 should be higher plus a given predetermined extra threshold as compared to the strength of signal reflected from obstacles (taking into account internal algorithms of averaging and false signal suppression). This allows verifying proper performance of the ELG in the target application. Additional criteria of signal evaluation may also be used, for example a simulated signal to noise ratio (SNR).

Figure 2B:
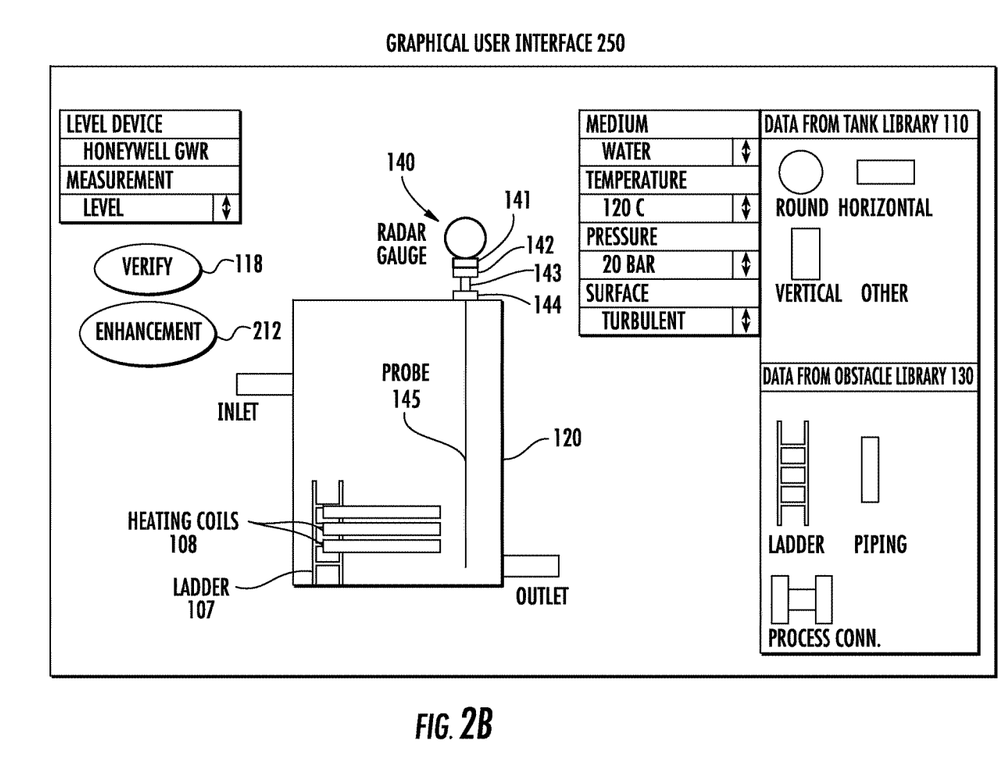
FIG. 2B is depiction of an example GUI that obtains information from the computing portion of its ELG configuration and simulation tool described for configuring a GWR gauge, according to another example embodiment.

FIG. 2B is depiction of an example GUI 250 that obtains information from its EGL configuration tool (see, e.g., ELG configuration tool 300 in FIG. 3) regarding the radar gauge 140, again described with regard to configuring a radar gauge 140 for a GWR system, according to another example embodiment. GUI 250 is shown including an "enhancement" button 212 which when used is operable to execute an enhancement algorithm stored in the ELG configuration tool which automatically identifies and proposes parameters to customize the configuration of the ELG to provide better performance (e.g., higher signal power and less noise). Example parameters to customize include different material for the process seal or material for the antenna to better match the corrosion, pressure, and temperature properties of the measured material.

To enhance the measurement signal strength, the ELG configuration tool may also propose a different antenna type (e.g., horn antenna instead of rod antenna; coaxial antenna instead of wire antenna) or antenna length and/or identify a better mounting location for the ELG in the target application. The enhancement includes increasing the strength (power) of measurement signal reflection from the surface of measured material in the tank 120 as compared with strength of measurement signal reflection from obstacles in the tank 120.

Figure 3:
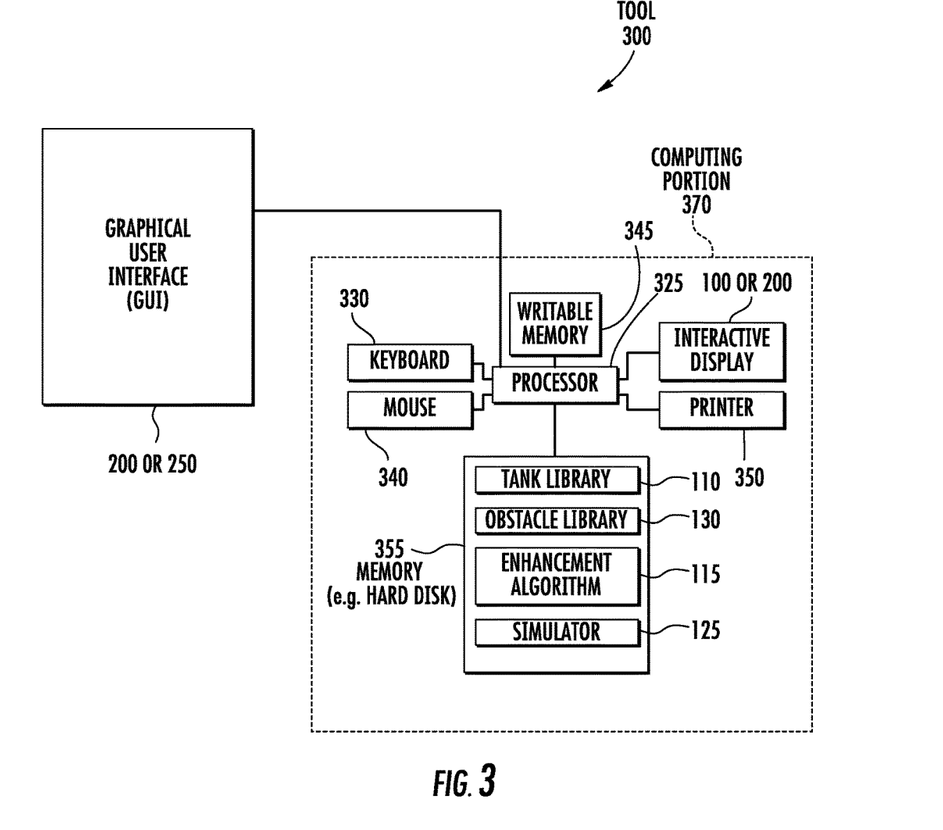
FIG. 3 is a block diagram depiction of an example ELG configuration and simulation tool including a GUI and a computing portion, according to an example embodiment.

FIG. 3 is a block diagram depiction of an example ELG configuration tool 300 including a GUI (e.g., GUI 200 or 250 described above for GWR gauges) that it is communicably connected to a computing portion 370, according to an example embodiment. However, as noted above, disclosed embodiments extend beyond GWR gauges to free-space radar gauges, and ultrasonic level measurement gauges, as each of these gauges work in essentially the same manner.

The communicable connection can be via a wired, optical, or wireless connection (with appropriate transceivers and antennas). Computing portion 370 is shown including a processor 325, writeable memory 345 generally comprising non-volatile writable memory (e.g., static random access memory (SRAM)), high capacity memory 355 (e.g., a hard disk drive) that stores a tank library 110, an obstacle library 130, as well as algorithms including a disclosed enhancement algorithm 115 and a simulator 125. A user interface is shown as a keyboard 330 and mouse 340, and a printer 350 are also shown coupled to the processor 325. Processor 325 can compromise a digital signal processor (DSP) or a microcontroller unit (MCU). A part of the ELG configuration tool 300 or the whole ELG configuration tool may be also placed on a virtual server or in the cloud, and can be provided to the customer using a remote access through the Internet and a website interface.

After the verification and enhancement processing, the resulting configuration data for the ELG can be automatically used in the customer's ordering process from the vendor, such as from Honeywell International, the assignee of this patent application. Process parameters (e.g., temperature, pressure, medium and surface) can also be exported by the ELG configuration tool 300 to be automatically loaded into memory of the ELG such as radar gauge 140 during production to reduce installation time of the ELG.

In operation of ELG configuration tool 300, using a user interface a user (customer) can enter application data into the tool, for example the size (volume) of the tank, measured medium, pressure, temperature, etc. as explained above. The user would generally enter many of the data again into the ELG, when he or she receives it from the manufacturing facility and installs it. To save time, the ELG configuration tool 300 can generate an electronic file with a list of these parameters and values.

The file can have a distinct identification number (ID) for unique identification. The ID can be a part of the ordering code of the ELG. The file can be stored on the tool vendor's server, such as on a Honeywell International' server. When a customer orders the new ELG, he or she can provide the ordering code. The production factory will be able to look up and download the corresponding file using the ID number, embedded in the ordering code. There are other ways known to those having ordinary skill in the art of computer programming to associate the new ELG with the corresponding electronic file.

Example applications for disclosed embodiments include ELG configuration for chemical and petrochemical storage tanks, pharmaceutics and tank (e.g., oil) terminals. However, disclosed ELG configuration can be used for other processing facilities.

While various disclosed embodiments have been described above, it should be understood that they have been presented by way of example only, and not as a limitation. Numerous changes to the disclosed embodiments can be made in accordance with the Disclosure herein without departing from the spirit or scope of this Disclosure. Thus, the breadth and scope of this Disclosure should not be limited by any of the above-described embodiments. Rather, the scope of this Disclosure should be defined in accordance with the following claims and their equivalents.

Although disclosed embodiments have been illustrated and described with respect to one or more implementations, equivalent alterations and modifications will occur to others skilled in the art upon the reading and understanding of this specification and the annexed drawings. While a particular feature may have been disclosed with respect to only one of several implementations, such a feature may be combined with one or more other features of the other implementations as may be desired and advantageous for any given or particular application.

The invention claimed is:

1. A method of configuring an electronic level gauge (ELG), comprising:
    providing a combined ELG configuration and simulation tool (ELG configuration tool) including a graphical user interface (GUI) having a user interface, said ELG configuration tool including a processor implementing a stored enhancement algorithm and a simulator, and a library including a tank library providing a plurality of tank shapes;
    said user interface receiving application configuration information including (i) a selection of one of said plurality of tank shapes, (ii) an identification of a mounting location for positioning said ELG, and (iii) at least one process detail;
    said simulator generating a calculated strength of a measurement signal reflected from a surface of material in said tank library for at least one level, and
    comparing said calculated strength to a predetermined strength;
    wherein if said calculated strength is less than (<) said predetermined strength, said ELG configuration tool prompting a change in at least one of said application configuration information for said ELG to be entered by a user on said user interface, said simulator then after said change is entered recalculating said calculated strength and then comparing said recalculated strength to said predetermined strength, and repeating said prompting said change and said recalculating said calculated strength until said recalculated strength is greater than or equal to (≥) said predetermined strength;
    sending said application configuration information after said change or said changes which provides said recalculated strength ≥ said predetermined strength to a manufacturing facility for said ELG, and
    said manufacturing facility utilizing said application configuration information after said change or said changes to customize said ELG for said user.

2. The method of claim 1, wherein said library further comprises an obstacle library including a plurality of tank obstacles, wherein said application configuration information further comprises (iv) a selection of at least a first obstacle from said plurality of tank obstacles, and (v) a position for said first obstacle in a tank (first obstacle position), and wherein said ELG configuration tool prompts said change or said changes in at least said first obstacle, said first obstacle position and said mounting location.

3. The method of claim 2, wherein said predetermined strength is a strength of a measurement signal reflected from said first obstacle plus a predetermined amount.

4. The method of claim 3, wherein said predetermined strength is a minimum signal strength.

5. The method of claim 1, wherein said process detail is selected from process pressure, temperature, and type of material in said tank.

6. The method of claim 1, wherein upon initiating said enhancement algorithm, said ELG configuration tool automatically proposes a change to a configuration aspect of said ELG selected from a type of probe, a length of said probe, a material for said probe, and a connection type, or a new one of said mounting location.

7. The method of claim 1, wherein said ELG comprises a guided wave radar (GWR) gauge, a free-space radar gauge, or an ultrasonic level measurement gauge.

8. The method of claim 1, further comprising transferring data for a target application from said ELG configuration tool to both a manufacturing facility for said ELG configuration tool and said ELG.

9. A combined electronic level gauge (ELG) configuration and simulation tool (ELG configuration tool), comprising:
    a processor implementing a stored enhancement algorithm and a simulator, and a library including a tank library including a plurality of tank shapes;
    a graphical user interface (GUI) having a user interface, said user interface receiving application configuration information including (i) a selection of one of said plurality of tank shapes, (ii) an identification of a mounting location for positioning said ELG, and (iii) at least one process detail;
    said simulator generating a calculated strength of a measurement signal reflected from a surface of material in said tank library for at least one level, and
    comparing said calculated strength to a predetermined strength;
    wherein if said calculated strength is less than (<) said predetermined strength, said ELG configuration tool prompting a change in at least one of said application configuration information for said ELG to be entered by a user on said user interface, and said simulator then after said change recalculating said calculated strength and then comparing said recalculated strength to said predetermined strength, and repeating said prompting said change and recalculating said calculated strength until said recalculated strength is ≥ said predetermined strength, said application configuration information after said change or said changes which provides said recalculated strength ≥ said predetermined strength for including in an electronic file configured for sending as an electronic file with a list of parameters and values to a manufacturing facility for said ELG to utilize said configuration information after said change or said changes to customize said ELG for said user.

10. The ELG configuration tool of claim 9, wherein said library further comprises an obstacle library including a plurality of tank obstacles, wherein said application configuration information further comprises (iv) a selection of at least a first obstacle from said plurality of tank obstacles, and (v) a position for said first obstacle in a tank (first obstacle position), and wherein said ELG configuration tool prompts said change or said changes in at least said first obstacle, said first obstacle position and said mounting location.

11. The ELG configuration tool of claim 10, wherein said predetermined strength is a strength of a measurement signal reflected from said first obstacle plus a predetermined amount.

12. The ELG configuration tool of claim 11, wherein said predetermined strength is a minimum signal strength.

13. The ELG configuration tool of claim 9, wherein said process detail is selected from process pressure, temperature, and type of material in said tank library.

14. The ELG configuration tool of claim 9, wherein upon initiating said enhancement algorithm, said ELG configuration tool automatically proposes a change to a configuration aspect of said ELG selected from a type of probe, a length of said probe, a material for said probe, and a connection type, or a new one of said mounting location.

15. The ELG configuration tool of claim 9, wherein said ELG comprises a guided wave radar (GWR) gauge, a free-space radar gauge, or an ultrasonic level measurement gauge.

* * * * *